(12) United States Patent
Lester et al.

(10) Patent No.: US 10,406,499 B2
(45) Date of Patent: Sep. 10, 2019

(54) MIXING REACTOR AND METHOD

(71) Applicant: THE UNIVERSITY OF NOTTINGHAM, Nottinghamshire (GB)

(72) Inventors: Edward Lester, Nottinghamshire (GB); Thomas Huddle, Nottinghamshire (GB)

(73) Assignee: The University of Nottingham, Nottingham, Nottinghamshire (GB)

( * ) Notice: Subject to any disclaimer, the term of this patent is extended or adjusted under 35 U.S.C. 154(b) by 325 days.

(21) Appl. No.: 15/037,520

(22) PCT Filed: Nov. 19, 2014

(86) PCT No.: PCT/GB2014/053413
§ 371 (c)(1),
(2) Date: May 18, 2016

(87) PCT Pub. No.: WO2015/075439
PCT Pub. Date: May 28, 2015

(65) Prior Publication Data
US 2016/0279589 A1    Sep. 29, 2016

(30) Foreign Application Priority Data

Nov. 19, 2013 (GB) .................................. 1320417.7

(51) Int. Cl.
*B01J 19/24* (2006.01)
*B01J 14/00* (2006.01)
(Continued)

(52) U.S. Cl.
CPC ............ *B01J 14/00* (2013.01); *B01F 5/0471* (2013.01); *B01F 15/065* (2013.01); *B01J 3/008* (2013.01);
(Continued)

(58) Field of Classification Search
None
See application file for complete search history.

(56) References Cited

U.S. PATENT DOCUMENTS 4,124,353 A * 11/1978 Prudhon ................... F23C 7/06
431/173
2013/0134106 A1* 5/2013 Suzuki .................... C02F 1/025
210/763

FOREIGN PATENT DOCUMENTS

DE    102006015708 A1    10/2007
WO    2005077505 A2     8/2005
(Continued)

OTHER PUBLICATIONS

International Search Report and Written Opinion received for Patent Application No. PCT/GB2014/053413. dated Mar. 23, 2015. 11 pages.

*Primary Examiner* — Jennifer A Leung
(74) *Attorney, Agent, or Firm* — Finch & Maloney PLLC

(57) ABSTRACT

A mixing reactor (1), the reactor comprising a body (2) having a first inlet (3), a second inlet (5) and an outlet (4), in which there is an inner passage (6) through the body (2) from the first inlet (3) at a first end (12) of the body (2) to the outlet (4) at a second end of the body (2) along a length of the body (2), the inner passage (6) having a side wall (17) along the length, and an outer passage (7) closer to a surface (14) of the body (2) than the inner passage (6), the outer passage (7) running from the second inlet (5) at the second end, travelling through the body (2) along the length and meeting the inner passage (6) at a junction (11) at the first end, the outer passage (7) joining the inner passage (6) through the side wall (17) at the junction (11). Such a mixing reactor can be used for producing particles such as nano-particles or Metal-Organic frameworks. Furthermore, we disclose a cascade of such reactors and a method of using (Continued)

such reactors to mix fluids, typically but non-exclusively so as to produce such particles.

21 Claims, 6 Drawing Sheets

(51) Int. Cl.
  *B01J 3/00* (2006.01)
  *B01F 5/04* (2006.01)
  *B01F 15/06* (2006.01)
  *B01J 19/00* (2006.01)
  *B01F 5/00* (2006.01)

(52) U.S. Cl.
  CPC ......... *B01J 19/0046* (2013.01); *B01J 19/242* (2013.01); *B01J 19/244* (2013.01); *B01J 19/2415* (2013.01); *B01F 2005/0022* (2013.01); *B01F 2215/0036* (2013.01); *B01J 2219/0059* (2013.01); *B01J 2219/00495* (2013.01); *B01J 2219/00599* (2013.01)

(56) References Cited

FOREIGN PATENT DOCUMENTS

| WO | 2011148121 | A1 | 12/2011 |
| WO | 2013034632 | A2 | 3/2013 |
| WO | 2015075439 | A1 | 5/2015 |

* cited by examiner

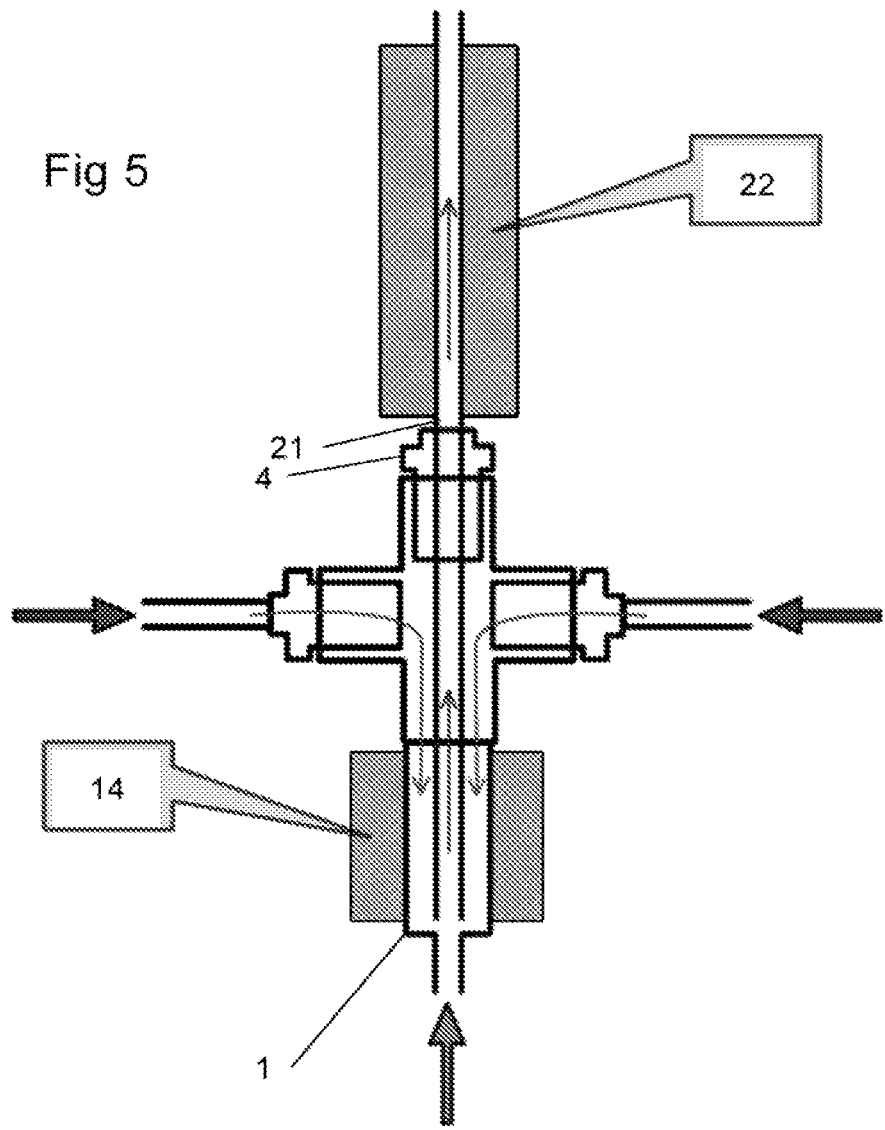

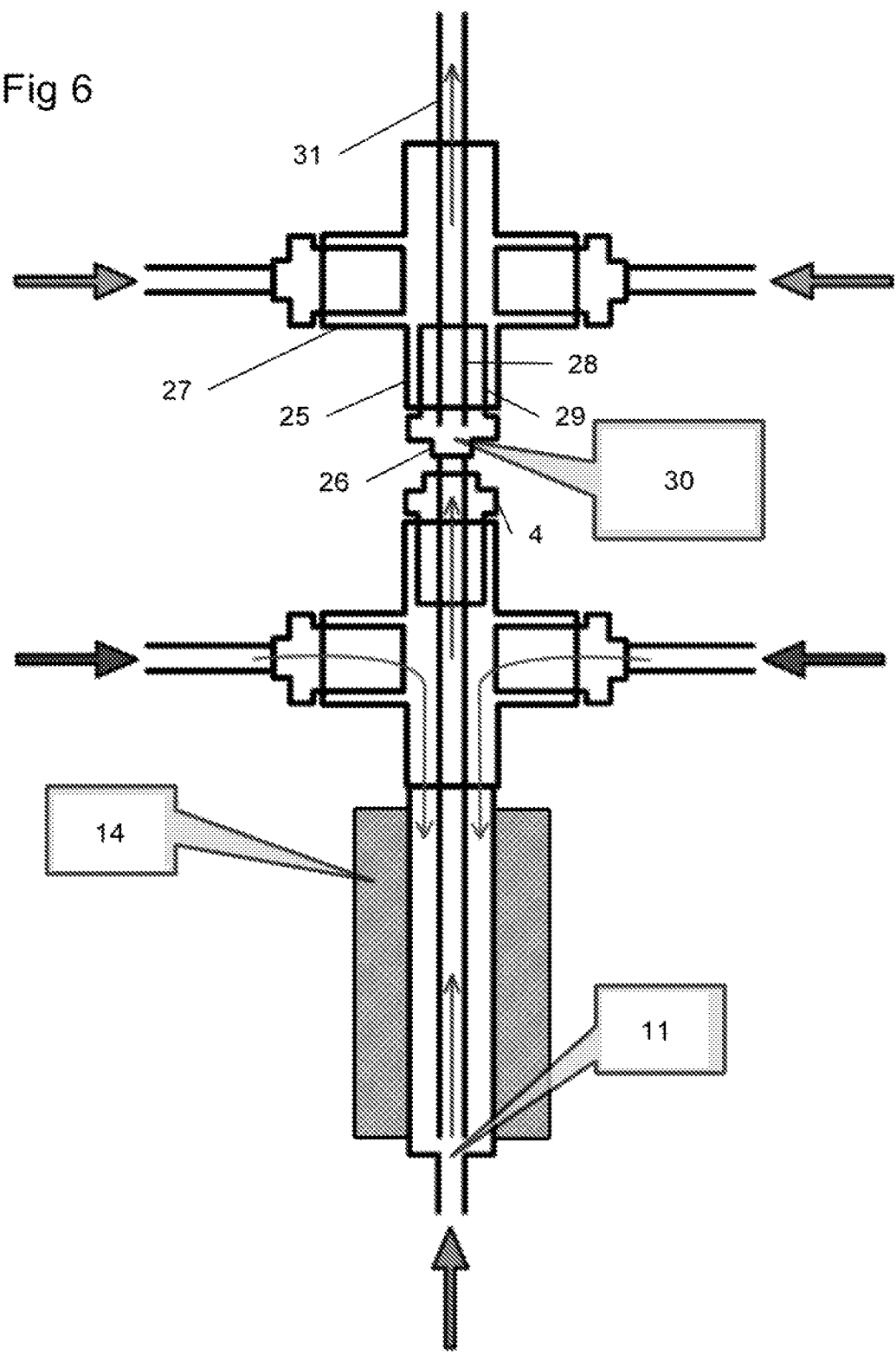

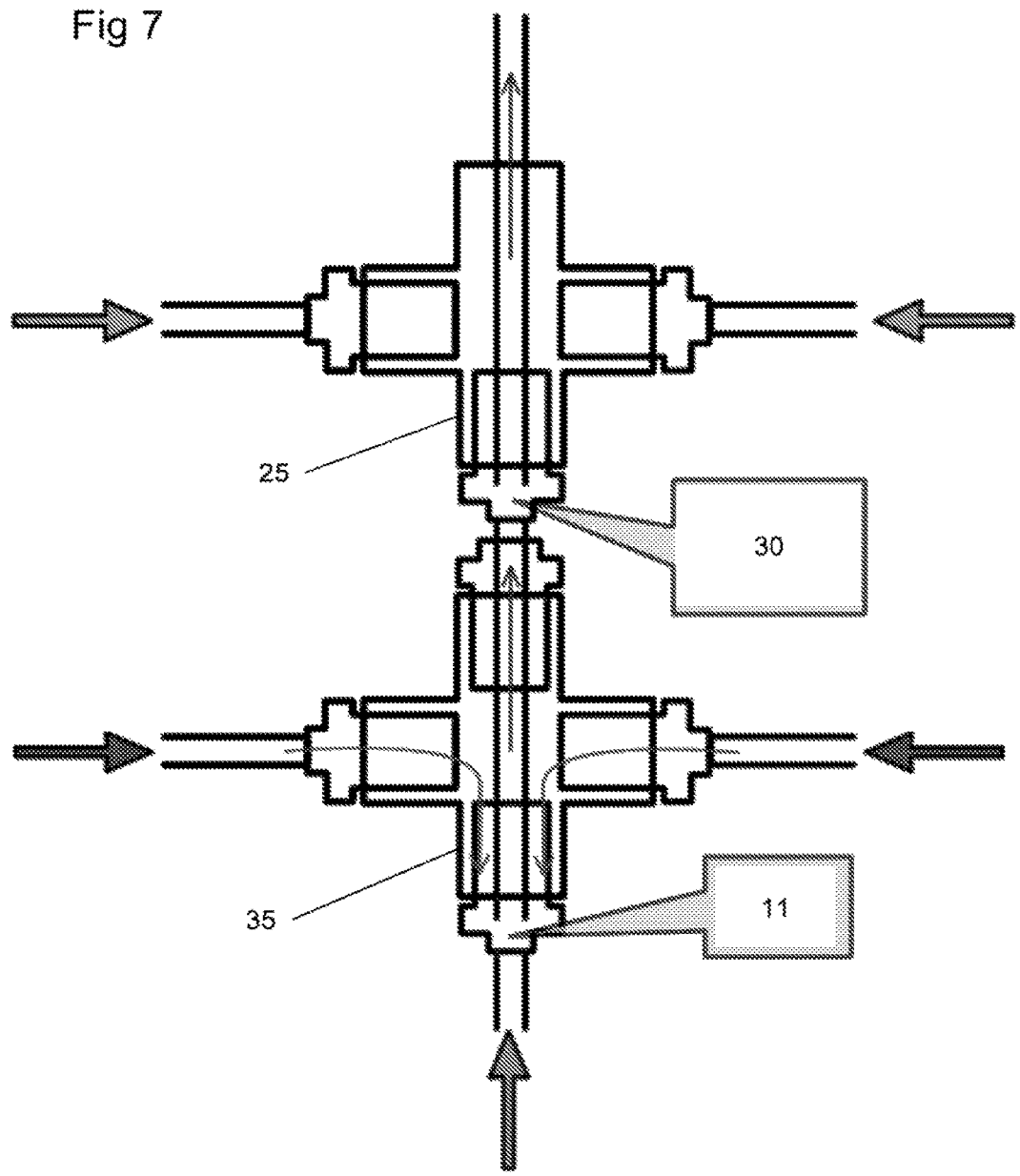

MIXING REACTOR AND METHOD

This invention relates to mixing reactors such as may (non-exclusively) be suitable for producing particles such as nanoparticles or Metal-Organic frameworks, a cascade of such reactors and a method of using such reactors to mix fluids, typically but non-exclusively so as to produce such particles.

Metal and metal oxide particles with nanometer scale dimensions have a wide range of uses, including (but not limited to) catalysts, pigments, polishes, ultraviolet absorbers and in ceramics. It is well known that such particles can be formed by chemical reaction of aqueous solutions of metal salts with heated, pressurised or supercritical water. In principle, this methodology offers distinct advantages over other methods of nanoparticle creation in terms of cost and viability as it allows the reaction to be performed as a continuous process. However, it is difficult to perform this reaction on a commercial scale utilising current methods because existing reactor configurations do not allow the precipitation reaction to be controlled effectively leading to frequent blockage of the reactor and inadequate control of particle size and shape. Hence within this process, the design of the reactor where the water and the salt solution mix is of crucial importance to the size and properties of the nanoparticles produced.

The PCT patent application published as WO2005/077505 describes a counter-current mixing reactor where supercritical water is introduced into a first inlet and a metal salt solution is introduced at a second inlet, the resultant nanoparticle-bearing suspension being extracted at an outlet. In this case, the first inlet is positioned within the outlet, so that the mixing occurs where the flow of supercritical water changes direction through 180 degrees.

We are also aware of the PCT patent application publication WO2013/034632, which discloses a mixing reactor that introduces the supercritical water parallel to the flow of the metal salt solution, then uses mechanical impellers to achieve mixing.

We are also aware of the PCT patent application publication WO2011/148121, which discloses a co-current mixer, where the metal salt solution is introduced through two opposing inlets having a common outlet, and supercritical water is introduced through a third inlet within the outlet, such that the metal salt solution and the supercritical water introduced at their respective inlets flow in the same direction through the outlet. However, we have appreciated that this leads to preheating of the metal salt solution prior to the mixing point (as the inlet for the supercritical fluid necessarily must pass through the flow of metal salt solution) and consequent cooling of the supercritical water, and to difficulties in ensuring a symmetrical flow in the outlet, as the supercritical water inlet cannot be long enough to ensure a satisfactorily symmetrical flow without leading to an unacceptable pre-mixing heat transfer from the supercritical water to the metal salt solution.

According to a first aspect of the invention, there is provided a mixing reactor, the reactor comprising a body having a first inlet, a second inlet and an outlet, in which there is an inner passage through the body from the first inlet at a first end of the body to the outlet at a second end of the body along a length of the body, the inner passage having a side wall along the length, and an outer passage closer to a surface of the body than the inner passage, the outer passage running from the second inlet at the second end, travelling through the body along the length and meeting the inner passage at a junction at the first end, the outer passage joining the inner passage through the side wall at the junction.

Thus, because the outer passage is closer to the surface than the inner passage, it can be more easily heated by a heater surrounding the mixing reactor than the inner passage or the fluid flowing into the first inlet. As such, application of a heater to the body will preferentially heat fluid flowing through the outer passage, and is unlikely to substantially heat fluid flowing into the first inlet until after it has passed the junction. Thus, if a metal salt is introduced to the first inlet, there will be no significant heating of the first inlet by a heater attached to the body, but there will be heating of a (typically supercritical) fluid introduced into the second inlet.

Furthermore, because the fluid is being introduced through the side wall of the inner passage, this will introduce turbulence into the fluid flow through the reactor, thus achieving efficient mixing without the need for mechanical mixing means or so on. The initial mixing location is predictable, as it will be the junction, where the two fluids are introduced. In addition, if the reactor is used with the second end uppermost, buoyancy effects will increase the mixing of the two fluids as the hot fluid from the outer passage will want to rise relative to the cooler unheated fluid from the first inlet, thus causing differential buoyancies.

The outer passage may enter the inner passage at an angle of 90 degrees to the length, plus or minus 45, 30, 15, 5 or 1 degrees. The junction may comprise an orifice in the inner wall, with a portion of the outer passage preceding the orifice that is at the angle relative to the length.

There may be a further outer passage that is also closer to the surface than the inner passage, the further outer passage having a further second inlet at the second end, travelling through the body along the length and meeting the inner passage at a further junction at the first end, the further outer passage joining the inner passage through the side wall at the further junction. Typically, the further outer passage will be symmetrical to the outer passage relative to the inner passage; this allows for symmetrical mixing, which can allow the reactor generate the best products in terms of composition, uniform particle sizes and narrow particle size distribution.

Alternatively, the outer passage could comprise a sleeve coaxially surrounding the inner passage; this would also provide for symmetrical mixing.

Typically, the surface will exclude the first and second ends. The reactor may further comprise a heater coupled to the surface, such as a band heater. This will, as discussed previously, preferentially heat the outer passage rather than the inner passage or the first inlet. As such, the body may be made of heat-conductive material, such as a metal material, such as stainless steel, typically stainless steel 316, or alloys such as Hastelloy, Inconel, Monel or Nimonic.

The reactor may comprise an extension passage, extending out of the body from the outlet. This can allow the fluid flowing out of the reactor to be provided with heating or cooling as desired. As such, the extension passage may be provided with heating or cooling apparatus through which it passes.

The reactor may be suitable for mixing two fluids. Typically, it will be suitable for forming particles, such as nanoparticles or metal-organic framework (MOF) particles.

According to a second aspect of the invention, there is provided a cascade of mixing reactors, comprising a first mixing reactor in accordance with the first aspect of the invention and a second mixing reactor in accordance with the first aspect of the invention, in which the outlet of the first mixing reactor is coupled to the first inlet of the second mixing reactor.

According to a third aspect of the invention, there is provided a method of mixing two fluids, comprising delivering a first fluid through the first inlet of a mixing reactor in accordance with the first aspect of the invention, delivering a second fluid through the second inlet of the mixing reactor and extracting a mixed fluid from the outlet.

This has been found to be a particularly efficient way of mixing two fluids. Typically, any or the first, second or mixed fluids can be liquids, including solutions or suspensions.

Typically, the first fluid will comprise a metal salt solution, and the mixed fluid will be a particle-bearing suspension. Thus, the mixing reactor will mix the fluid and the metal salt solution, so that they mix together and particles form. As discussed above, the mixing will be efficient due to the turbulence induced in the flow by the junction.

The method may comprise heating the second fluid. The heating may occur through the application of heat to the surface of the reactor. The application of heat may be through a heater, such as a band heater, applied to the surface of the reactor. Such heating will preferentially heat the second fluid and not the first fluid. Furthermore, the method may comprise heating the second fluid to a temperature above that of the first fluid before the second fluid is delivered to the second inlet.

The reactor may be used with the second end uppermost, so that buoyancy effects also assist with the mixing of the second fluid and the first fluid.

The second fluid may be water, typically supercritical water or alcohols or other organic solvents. Where the first fluid is a metal salt solution, the metal salt solution may be, for example, a solution of metal nitrates, metal sulfates, metal acetates, metal acetylacetones, metal halides, or metal carbonates, and more particularly may be any of Iron nitrate, iron acetate, iron sulfate, aluminium nitrate, zinc nitrate, copper nitrate, copper acetate, nickel nitrate, calcium acetate, calcium nitrate, barium nitrate, cobalt acetate, titanium bis(ammonium lactato)dihydroxide, titanium tetrachloride, platinum nitrate, palladium nitrate, cerium nitrate or others.

The method may comprise heating or cooling the mixed fluid as it passes through the extension tube.

The method may comprise passing the mixed fluid through a further mixing reactor in accordance with the first aspect of the invention, in which the mixed fluid is introduced to the first inlet of the further mixing reactor, a third fluid is introduced at the second inlet of the further mixing reactor and a further mixed fluid is extracted at the outlet of the further mixing reactor. The third fluid may be, for example, a secondary metal salt solution, or a solution containing a "capping agent", including but not limited to organic acids (e.g. citric acid), thiols (e.g. methanethiol) and polymers (e.g. polyvinylpyrrolidone).

The mixing reactor and the further mixing reactor may form a cascade in accordance with the second aspect of the invention.

The particles may be nanoparticles, or metal-organic framework (MOF) particles, or other suitable particles that can be formed by combining a metal salt solution with the fluid.

There now follows, by way of example only, description of embodiments of the invention, in which.

Figure 1:
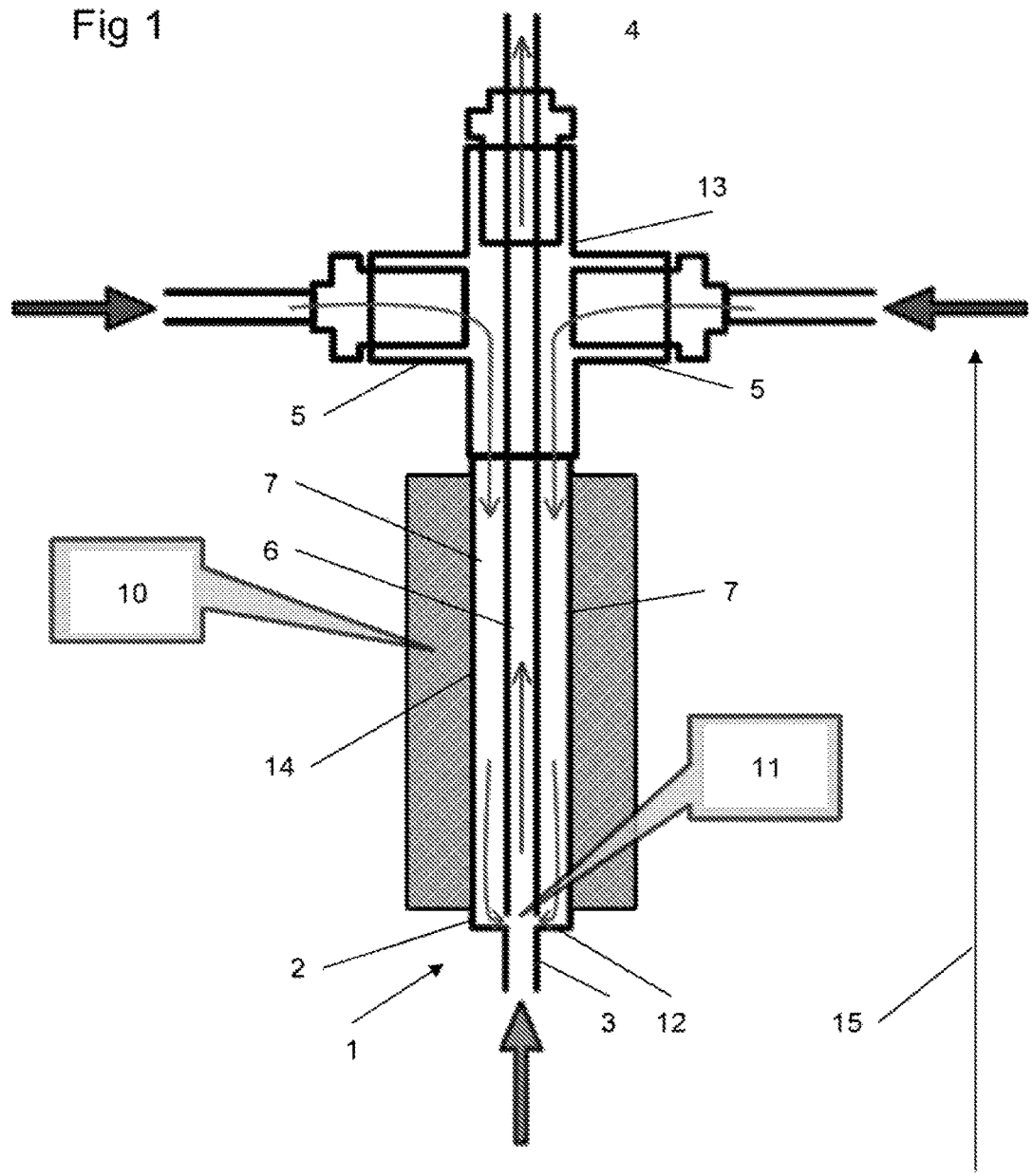
FIG. 1 shows a schematic cross section through a mixing reactor in accordance with a first embodiment of the invention.
Figure 2:
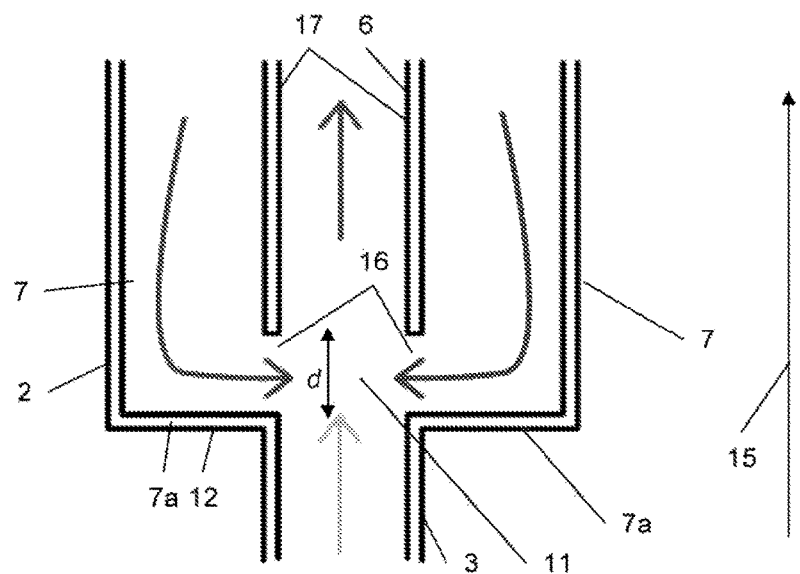
FIG. 2 shows an enlargement of FIG. 1 around the junction of the inner and outer passages.
Figures 3A, 3B:
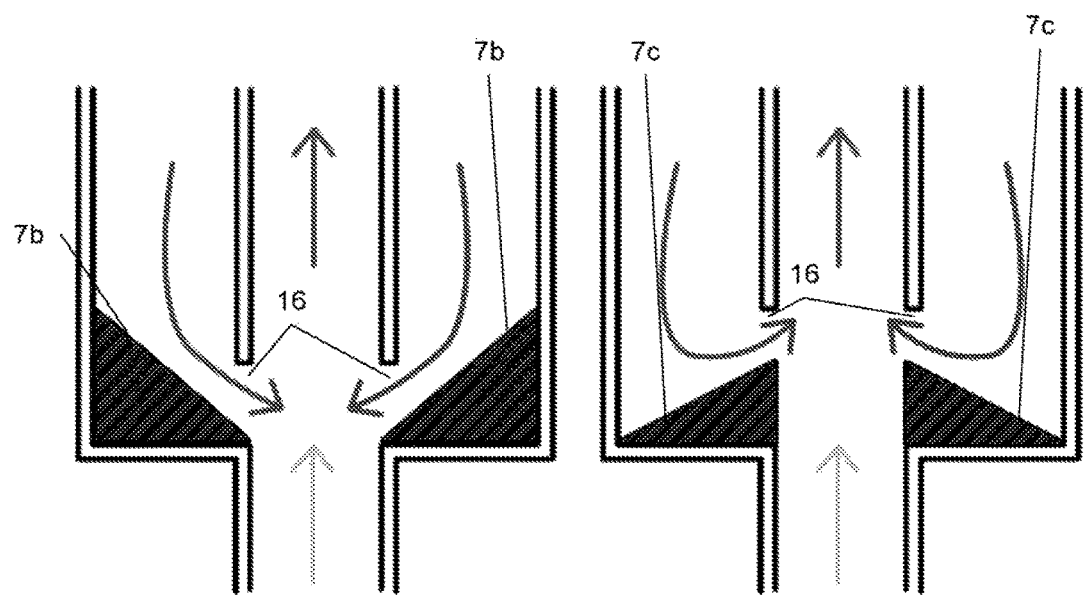
Figure 4:
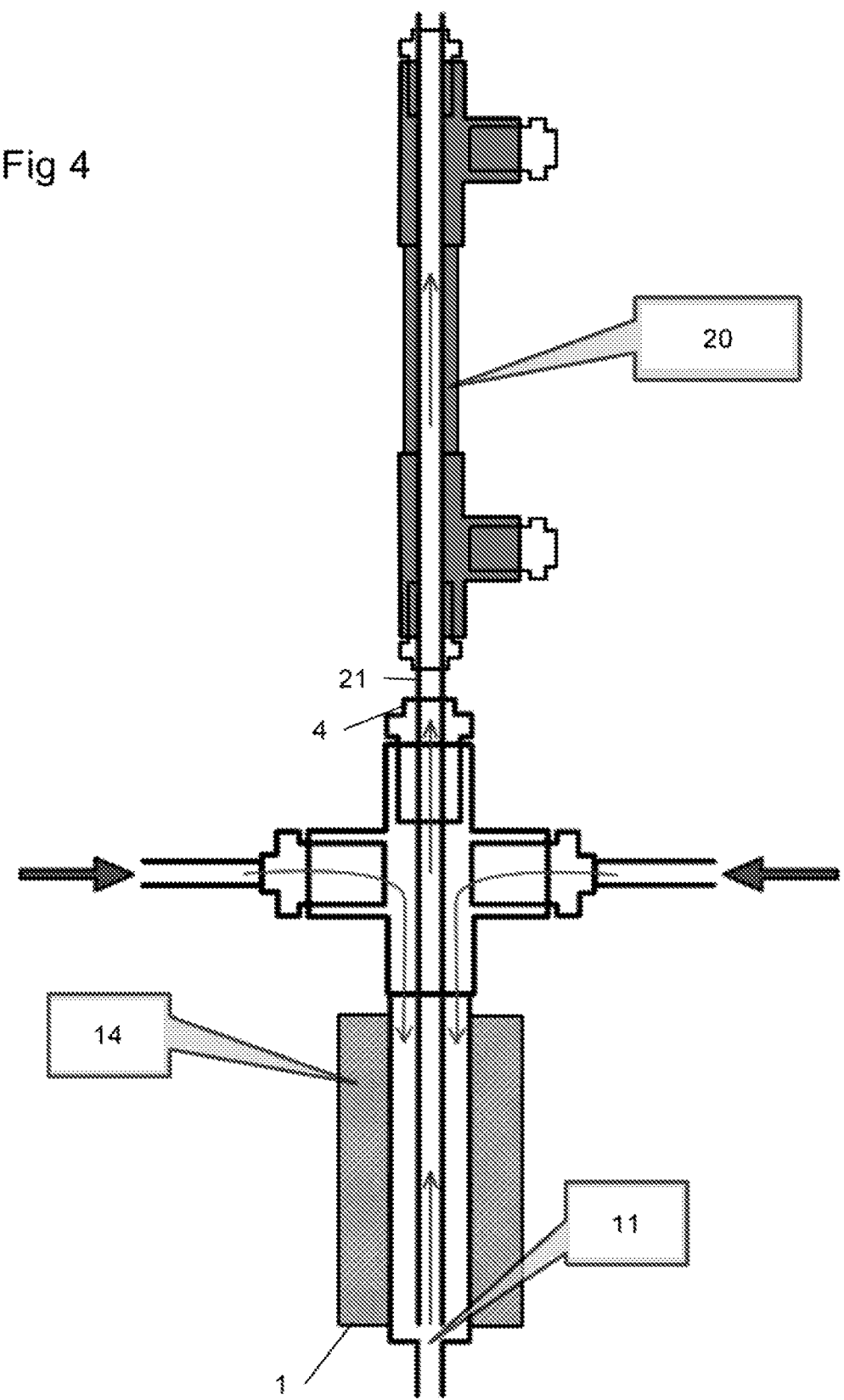

FIGS. 3a and 3b each show a corresponding view of that of FIG. 2, for two alternative embodiments of the invention;

FIG. 4 shows the mixing reactor of FIG. 1 being used in series with a heat exchanger;

FIG. 5 shows the mixing reactor of FIG. 1 being used in series with a heater;

FIG. 6 shows the mixing reactor being used in cascade with another mixing reactor; and FIG. 7 shows a cascade of two mixing reactors in accordance with a further embodiment of the invention.

FIGS. 1 and 2 show a mixing reactor 1 in accordance with a first aspect of the invention. It comprises a metal body 2 having a first inlet 3 in a first end 12 of the body and two second inlets 5 and an outlet 4 in a second end of the body. The body 2 is generally elongate and has a length 15, and an outer surface 14 separating the two ends 12, 13. The reactor is used with the second end 13 uppermost (that is as if the accompanying drawings were viewed vertically).

An inner passage 6 runs from the first inlet 3 to the outlet 4 along the length. Two outer passages 7 run from respective second inlets 5 at the second end of the body to a junction 11 at the first end of body, where they each enter the inner passage 6. The outer passages 7 lie between the inner passage 6 and the outer surface 14.

As can be seen in more detail in FIG. 2 of the accompanying drawings, the outer passages 7 join the inner passage 6 through respective orifices 16 in the side walls 17 of the inner passage 6. In each case, there is a short length of outer passage 7a that is perpendicular to the length 15 and hence the inner passage 6.

Thus, if a metal salt solution is introduced into the first inlet 3, and preheated supercritical water (or other suitable fluid such as alcohol) is introduced into the second inlets 5, the supercritical water will pass through outer passages 7 until it reaches the orifices 16. At this point, the supercritical water will be introduced into the stream of metal salt solution that is passing from the first inlet 3 through the inner passage 6. Because of the perpendicular introduction, turbulence will be induced at the junction 11, leading to mixing of the metal salt solution and the supercritical water. The mixing is consistent, symmetrical and thorough, leading to a satisfactory yield of consistent nanoparticles. The turbulence and consequent mixing continues as the mixed fluid passes up the inner passage 6 towards the outlet 4, aided by the differences in density and viscosity between the two fluids. There is no need to employ mechanical impellers or the like. The nanoparticle-bearing suspension can then be extracted from the outlet 4.

Furthermore, we have found that by appropriate control of the size d of the apertures 16, and the flow rate of the supercritical fluid, "backflow" (that is, flow of the metal salt solution into the outer passages) can be substantially eliminated. Thus, we can avoid the formation of nanoparticles in undesired locations. As such, the flow rate of the supercritical fluid needs to be high enough to avoid backflow, and the size d of the orifices should be small enough to avoid backflow. A high flow rate and a small orifice will lead to increased turbulence and so more homogeneous mixing, although too small an orifice will lead to back-pressure issues with pumping the supercritical fluid. There are several parameters which may need to be considered when choosing the flow rate, including the flow rate of the metal salt solution, the relative diameters of the passages 6, 7, and the lengths of the perpendicular lengths 7a of the outer passages.

It can be seen that the passages 6, 7 are symmetrical about the centreline of the inner passage 6. This means that the mixing is symmetrical, which we have appreciated as being important when generating the best products in terms of composition, uniform particle sizes and narrow particle size distribution. The whole flow can be very quickly and evenly mixed together.

In order to keep the supercritical water hot, there is a provided a band heater 10 around the surface 14. This therefore preferentially heats the outer passages 7 and so their contents, the supercritical water. Because the heater 10 does not extend to the first inlet 3 or across the first end 3, there is no significant heating of the metal salt before reaching the junction 11. Unwanted heating can lead to precipitation of the metal salts out of solution and can effect the formation of nanoparticles, as well as leading to pumping problems. On the other hand, there is little opportunity for the supercritical water to cool having passed through the outer passage adjacent to the heater, and so will be at the correct temperature for the reaction. Any heat loss between the second inlets 5 and the heater 10 can be mitigated by using suitable thermal lagging.

It can be seen that the present reactor provides little opportunity for particle accumulation and/or lining of internal surfaces of the reactor, which are most likely to occur where the product stream is hot. The potential for particle accumulation can be minimised by avoiding narrow constrictions, artefacts such as edges, ridges and corners (on the internal surfaces of the apparatus) and changes in overall flow direction in the region of apparatus between the mixing point (that is, the junction 11) and where the product stream is cooled after the outlet 4. The present design allows for a reactor that is completely free of zones which may allow particle accumulation. The present reactor can be made substantially seamless and without any loss of symmetry between the junction 11 and the point where the product has been substantially cooled in, for example, a downstream heat exchanger.

The angle at which the supercritical water flow is introduced can be varied as shown in the alternative embodiments shown in FIGS. 3a and 3b of the accompanying drawings. In these, the part 7b, 7c of the outer passage leading to the orifices 16 can be angled against the flow from the first inlet as shown in FIG. 3a, or with the flow as shown in FIG. 3b, as long as a substantial perpendicular element is still maintained.

The mixing reactor 1 can be used in series with various other equipment without deleterious effect on the advantages it provides. As shown in FIG. 4 of the accompanying drawings, a heat exchanger 20 is connected around an extension tube 21 extending, typically seamlessly from the outlet 4. Thus, the nanoparticle-bearing suspension can be cooled without presenting significant opportunity for blockages to form.

Likewise, if it is desired to keep the nanoparticle-bearing suspension hot, a further heater 22 can be provided around the extension tube 21. Again, there is little opportunity for nanoparticle agglomerations to form.

In FIG. 6, the mixing reactor 1 of the first embodiment of the invention is employed in series with a second mixing reactor 25. The second mixing reactor 25 functions in a similar way to that 1 of the first embodiment, except that it is not provided with a heater 10. As such, the outlet 4 of the first mixing reactor 1 is coupled to the first inlet 26 of the second mixing reactor. A further fluid, for example, a secondary metal salt solution, or a solution containing a "capping agent", including but not limited to organic acids (e.g. citric acid), thiols (e.g. methanethiol) and polymers (e.g. polyvinylpyrrolidone), is introduced to the second inlets 27 of the second mixing reactor. The inner 28 and outer 29 passages of the second mixing reactor meet at a junction 30 in the same manner as in the first embodiment, the junction 30 providing a second mixing point. The further processed suspension then can be extracted from the second mixing reactor's outlet 31.

It should be noted also that the reactor, in both its first embodiment of FIGS. 1 and 2 and in the multi-stage configuration of FIG. 6 need not have a outer surface 14 with a band heater 10; the heated feed can instead be introduced using only cross-pieces and reducers (in this case a cross-piece is favoured significantly over a T-piece in order to achieve symmetrical mixing, as there is little distance for the heated flow to become uniform). The use of an outer surface 14 with a band heater 10 (as in FIG. 1) is likely to be favoured in certain scenarios (such as where increased residence time is required or the heated feed must be very hot), whereas the design without an outer surface and heater (as in the second mixing reactor of FIG. 6) is likely to suit other situations (where lower temperatures and/or short residence times are required). An example where both the mixing reactors 35, 25 in a multi-stage configuration lack the heater 10 around the surface 14 is shown in FIG. 7.

The invention claimed is:

1. A mixing reactor, the reactor comprising a body having a first inlet, a second inlet and an outlet; wherein:
   there is an inner passage through the body from the first inlet at a first end of the body to the outlet at a second end of the body along a length of the body, the inner passage having a side wall along the length, and
   there is an outer passage closer to a surface of the body than the inner passage, the outer passage running from the second inlet at the second end, travelling through the body along the length and meeting the inner passage at a junction at the first end, the outer passage joining the inner passage through the side wall at the junction, the outer passage joining the inner passage at an angle of 90 degrees to the length, plus or minus 45 degrees, and
   there is a further outer passage that is also closer to the surface than the inner passage, the further outer passage having a further second inlet at the second end, travelling through the body along the length and meeting the inner passage at a further junction at the first end, the further outer passage joining the inner passage through the side wall at the further junction.

2. The mixing reactor of claim 1, in which the outer passage joins the inner passage at an angle of 90 degrees to the length, plus or minus 5 degrees.

3. The mixing reactor of claim 1, in which the junction comprises an orifice in the side wall, with a portion of the outer passage preceding the orifice that is at the angle relative to the length.

4. The mixing reactor of claim 1, in which the further outer passage is symmetrical to the outer passage relative to the inner passage.

5. The mixing reactor of claim 1, comprising a heater coupled to the surface.

6. The mixing reactor of claim 1, comprising an extension passage, extending out of the body from the outlet, the extension passage provided with heating or cooling apparatus through which the extension passage passes.

7. The mixing reactor of claim 3, wherein portions of the side wall to either side of the orifice are collinear with each other.

8. A cascade of mixing reactors, comprising:
a first mixing reactor and a second mixing reactor, wherein one of the first or second mixing reactor includes a body having a first inlet, a second inlet and an outlet,
wherein
there is an inner passage through the body from the first inlet at a first end of the body to the outlet at a second end of the body along a length of the body, the inner passage having a side wall along the length, and
therein is an outer passage closer to a surface of the body than the inner passage, the outer passage running from the second inlet at the second end, travelling through the body along the length and meeting the inner passage at a junction at the first end, the outer passage joining the inner passage through the side wall at the junction, and
there is a further outer passage that is also closer to the surface than the inner passage, the further outer passage having a further second inlet at the second end, travelling through the body along the length and meeting the inner passage at a further junction at the first end, the further outer passage joining the inner passage through the side wall at the further junction; and
wherein the other of the first or second mixing reactor also includes a first inlet, a second inlet and an outlet, and
wherein the outlet of the first mixing reactor is coupled to the first inlet of the second mixing reactor, and wherein the outer passage joins the corresponding inner passage at an angle of 90 degrees to the corresponding length, plus or minus 45 degrees.

9. The cascade of mixing reactors of claim 8, wherein the first and second mixing reactors are similarly configured, in that they both include an inner passage, an outer passage, and a further outer passage, and each of the outer passages joins the corresponding inner passage at an angle of 90 degrees to the length, plus or minus 45 degrees.

10. The cascade of mixing reactors of claim 8, wherein the first and second mixing reactors are similarly configured, in that they both include an inner passage, an outer passage, and a further outer passage.

11. The cascade of mixing reactors of claim 8, comprising one or more heaters coupled to the body.

12. The cascade of mixing reactors of claim 8, wherein the first and second mixing reactors are similarly configured, in that they both include a body having a first inlet, a second inlet and an outlet, the cascade of mixing reactors comprising:
an extension passage of the first mixing reactor, extending out of the corresponding body from the outlet, the extension passage provided with heating or cooling apparatus through which the extension passage passes; and
an extension passage of the second mixing reactor, extending out of the corresponding body from the outlet, the extension passage provided with heating or cooling apparatus through which the extension passage passes.

13. The cascade of mixing reactors of claim 8, wherein at least one of the junction and the further junction comprises an orifice in the side wall, and portions of the side wall to either side of the orifice are collinear with each other.

14. A method of mixing two fluids, comprising:
delivering a first fluid through the first inlet of a mixing reactor, the mixing reactor including a body having a first inlet, a second inlet and an outlet, wherein
there is an inner passage through the body from the first inlet at a first end of the body to the outlet at a second end of the body along a length of the body, the inner passage having a side wall along the length, and
there is an outer passage closer to a surface of the body than the inner passage, the outer passage running from the second inlet at the second end, travelling through the body along the length and meeting the inner passage at a junction at the first end, the outer passage joining the inner passage through the side wall at the junction, the outer passage joining the inner passage at an angle of 90 degrees to the length, plus or minus 45 degrees, and
there is a further outer passage that is also closer to the surface than the inner passage, the further outer passage having a further second inlet at the second end, travelling through the body along the length and meeting the inner passage at a further junction at the first end, the further outer passage joining the inner passage through the side wall at the further junction;
delivering a second fluid through the second inlet of the mixing reactor; and
extracting a mixed fluid from the outlet.

15. The method of claim 14, in which the first fluid is a metal salt solution.

16. The method of claim 14, in which the mixed fluid is a particle-bearing suspension.

17. The method of claim 16, in which the particles are selected from the group comprising nano-particles and metal-organic framework (MOF) particles.

18. The method of claim 14, comprising heating the second fluid through the application of heat to the surface of the reactor.

19. The method of claim 14, in which the reactor is used with the second end uppermost.

20. The method of claim 14, in which the second fluid is selected from the group consisting of water, supercritical water, an organic solvent and an alcohol.

21. The method of claim 14, comprising:
passing the mixed fluid through a further mixing reactor, the further mixing reactor including a body having a first inlet, a second inlet and an outlet, wherein
there is an inner passage through the body from the first inlet at a first end of the body to the outlet at a second end of the body along a length of the body, the inner passage having a side wall along the length, and
there is an outer passage closer to a surface of the body than the inner passage, the outer passage running from the second inlet at the second end, travelling through the body along the length and meeting the inner passage at a junction at the first end, the outer passage joining the inner passage through the side wall at the junction, the outer passage joining the inner passage at an angle of 90 degrees to the length, plus or minus 45 degrees;
in which the mixed fluid is introduced to the first inlet of the further mixing reactor, a third fluid is introduced at the second inlet of the further mixing reactor and a further mixed fluid is extracted at the outlet of the further mixing reactor.

* * * * *